Sept. 9, 1924.

A. PECORELLA ET AL 1,507,680

ARTIFICIAL LIMB

Original Filed Oct. 17, 1921    3 Sheets-Sheet 1

Fig.1.

Inventors
Alberto Pecorella
Vincent Patricolo
Frederick H. Apel
by Leysen & Polk Attorneys

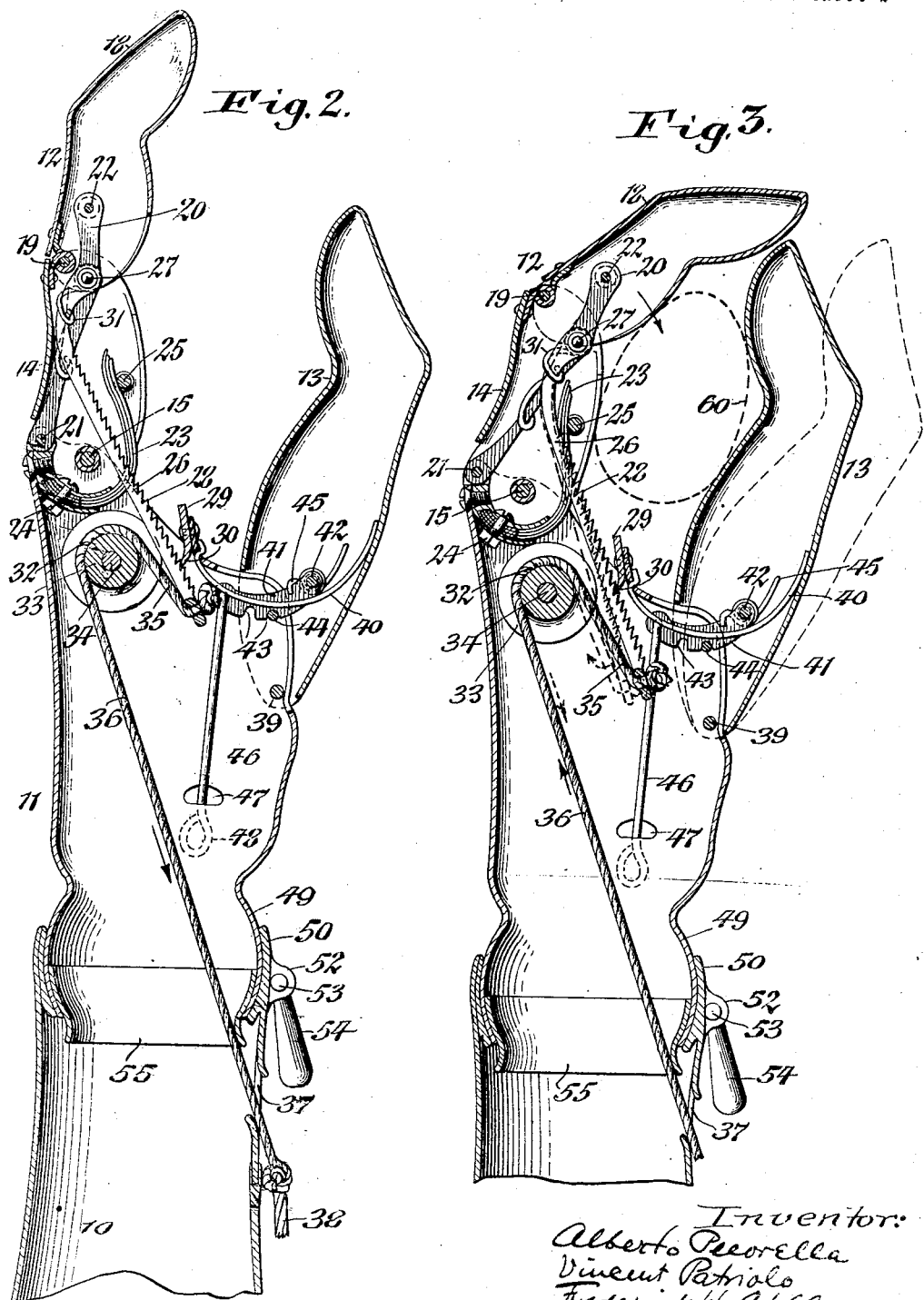

Sept. 9, 1924.
A. PECORELLA ET AL
1,507,680
ARTIFICIAL LIMB
Original Filed Oct. 17, 1921   3 Sheets-Sheet 3
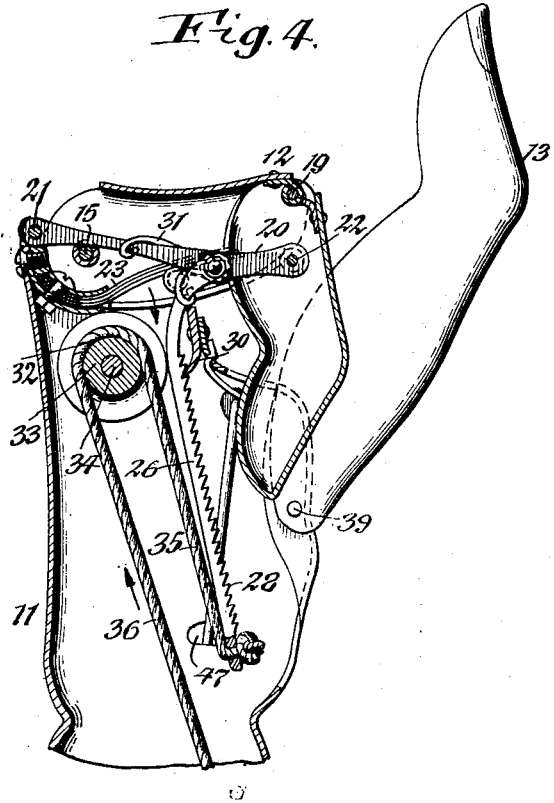
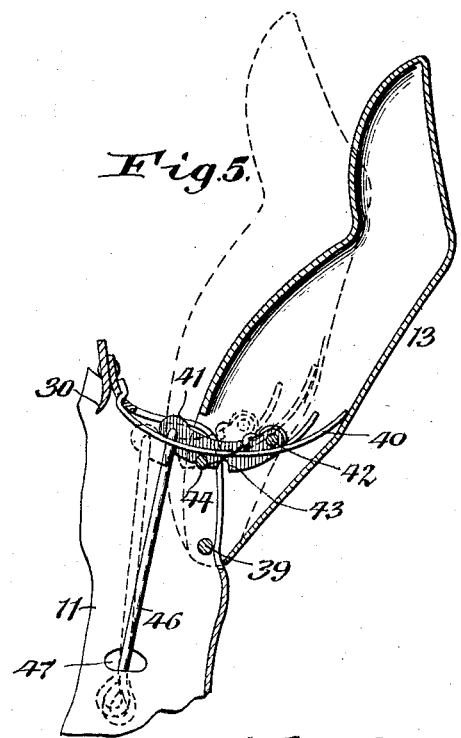
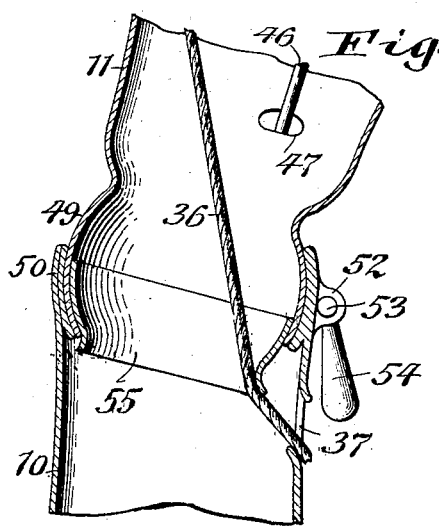
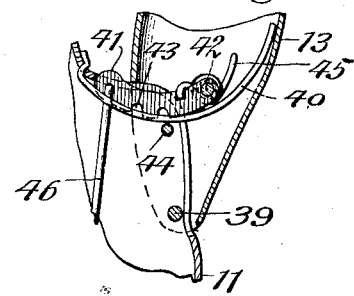
Inventors
Alberto Pecorella
Vincent Patricolo
Frederick H. Apel
by Geyer & Popp Attorneys Patented Sept. 9, 1924.

1,507,680

UNITED STATES PATENT OFFICE.

ALBERTO PECORELLA AND VINCENT PATRICOLO, OF BUFFALO, AND FREDERICK H. APEL, OF ATHOL SPRINGS, NEW YORK, ASSIGNORS, BY MESNE ASSIGNMENTS, TO LIVINGSTON ARTIFICIAL LIMB COMPANY, OF NEW YORK, N. Y., A CORPORATION OF DELAWARE.

ARTIFICIAL LIMB.

Application filed October 17, 1921, Serial No. 508,112. Renewed February 15, 1924.

*To all whom it may concern:*

Be it known that we, ALBERTO PECORELLA, a citizen of the United States, and resident of Buffalo, in the county of Erie and State of New York, VINCENT PATRICOLO, a subject of the King of Italy, and residing at Buffalo, in the county of Erie and State of New York, and FREDERICK H. APEL, a citizen of the United States, residing at Athol Springs, in the county of Erie and State of New York, have invented new and useful Improvements in Artificial Limbs, of which the following is a specification.

The object of this invention is to produce an artificial limb to take the place of a wrist and hand of a person, which limb is so organized that the same is of comparatively simple, durable and inexpensive construction and is capable of being readily and quickly adjusted to different positions and capable of reliably holding articles of different shapes.

In the accompanying drawings:

Figure 1 is an inside view of an artificial hand and wrist embodying our invention, some of the parts being shown in section. Figure 2 is a longitudinal section of the same showing the fingers and thumb in an open position. Figure 3 is a similar view of the fingers and thumb in a partly closed position. Figure 4 is a similar view showing one of the fingers in its completely closed position. Figure 5 is a fragmentary longitudinal section, showing the thumb locked in its outermost position. Figure 6 is a sectional view showing the latch of the thumb locking mechanism in its uncoupled position. Figure 7 is a longitudinal section similar to Figs. 1 and 3, but showing the palm tilted inwardly with reference to the wrist.

Similar characters of reference refer to like parts throughout the several views.

10 represents the hollow wrist of the artificial limb which is preferably constructed of leather or similar material and secured to the stump of the arm in any suitable manner, 11 the hollow palm which is pivotally connected at its inner or rear end with the outer end of the wrist, 12 a plurality of articulated fingers mounted on the outer front part of the palm and capable of being folded inwardly and unfolded outwardly relatively thereto, and 13 a thumb which is pivotally mounted on the inner front part of the palm.

Inasmuch as all of the fingers and the mechanism for operating the same are identical in construction the following description of one will apply to each of these fingers:

14 represents a hollow inner or rear finger section which is pivotally connected at its inner or rear end with the palm so as to be capable of swinging inwardly and outwardly relatively thereto, this pivotal connection being preferably effected by a pivot rod 15 extending through the inner parts of the several finger sections and supported at its opposite ends on the side portions of the palm and also supported between the adjacent inner finger sections by means of brackets 16 which receive the pivot rod 15 and are secured to the adjacent part of the palm by means of rivets 17, as shown in Fig. 1, or by any other suitable means.

18 represents the outer finger section of each finger which is pivotally connected at its inner or rear end with the outer or front end of the respective inner finger section by means of a hinge 19, as best shown in Figs. 2, 3 and 4, so that this outer finger section can be folded inwardly and outwardly relatively to the inner finger section and the palm and thumb. 20 represents a shifting link which is arranged lengthwise in the sections of each finger and pivotally connected at its inner end with the outer end of the palm adjacent to the outer side of the pivotal connection between the inner end of the respective inner finger section and the palm by means of a hinge 21, while the outer end of this link is connected by means of a pin 22 with the outer finger section at a point inwardly and forwardly from the pivotal connection between the sections of the respective finger. By means of this construction an outward movement of the sections of each finger will cause the same to assume a substantially straight position when swung outwardly to their maximum extent, as shown in Fig. 2, while upon moving these finger sections inwardly more or less the same will fold relatively to each other and to the palm and thumb, as shown in Figs. 3 and 4. Means are provided which constantly tend to move the sections of each finger inwardly into their folded position, which means are of a yielding character and preferably consist of a leaf spring 23 having generally the form of the letter C and arranged in the hollow part of the respective inner finger section, so that the bow of this spring is below the pivot 15. This spring is secured at its outer or fixed end to the inner finger section rearwardly and outwardly from the pivot 15 by means of a bolt 24 while its inner or free end bears against an abutment 25 having the form of a pin which is mounted on the inner finger section forwardly and inwardly from the pivot 15.

26 represents an adjusting bar arranged with its outer part within the finger and its inner part within the palm and having its outer end pivotally connected with the shifting link by means of a pin 27. The intermediate part of this adjusting bar is arranged between the pivot 15 of the respective inner finger section and the spring abutment 25 thereon. On its inner side this adjusting bar is provided with a longitudinal row of teeth 28 which are preferably of ratchet form, each tooth having an inclined inner or rear side and an abrupt outer or front side, as shown in Figs. 2, 3 and 4. The teeth of this adjusting bar are adapted to engage with a keeper 29 which extends crosswise of the palm and secured at its opposite ends thereto and is provided with an inclined retaining flange 30 which is adapted to be engaged by one or another of the longitudinal row of teeth of each of the adjusting bars 26, so that this keeper 29 serves to retain the sections of each finger in a more or less folded position in engagement with articles of various shapes. Each of the adjusting bars 26 is yieldingly turned in the direction for engaging its teeth with the keeper 29 by means of a spring 31 which is preferably provided with a coil surrounding the pivot pin 27 and has its opposite ends connected respectively with the link 29 and the adjusting bar 26, as shown for instance in Figs. 1 and 2. Each of the shifting bars is moved outwardly for the purpose of unfolding the sections of the respective finger, by means of an operating line 32, which is doubled upon itself to form a loop passing around a guide pulley 33 which is arranged on the palm adjacent to the outer side of the adjusting bar and backwardly from the respective finger sections. The pulleys 33 of the several fingers are mounted on a single pivot pin 34 which extends through these several pulleys and mounted at its opposite ends on the palm. The inner or releasing stretch 35 of this operating line passes inwardly and backwardly from the pulley 33 and is connected with the inner end of the adjusting bar 26 while the outer or pulling stretch 36 of this line passes outwardly and backwardly from the pulley 33 through the hollow wrist and through an opening 37 on the inner side thereof to the exterior of the artificial limb, the several pulling stretches 36 of the operating line being connected outside of the artificial limb with a single main operating line 38 which may be shifted in any suitable manner for the purpose of actuating the parts connected with these lines so as to open and close the hand. The arrangement of each pulley 33 relative to its companion adjusting bar is such that when a pulling action occurs upon the line 32 during which the pulling stretch 36 moves backwardly and the releasing stretch 35 moves forwardly, the adjusting bar 26 will first be moved laterally out of engagement from the keeper 29 and toward the pulley 33 and thereafter this bar will be moved forwardly or outwardly for the purpose of unfolding the respective finger sections which are operatively connected with this bar. Upon, however, quickly releasing the tension or pull upon the operating line 32 the spring 31 will immediately draw the adjusting bar 26 inwardly and cause one of its teeth to engage the keeper 29 and thus hold the sections of the respective finger against further outward or unfolding movement. Accordingly, when it is desired to close the hand upon an article for the purpose of grasping the same, the fingers are first moved outwardly to their fully unfolded position, which is done by pulling backwardly on the main operating line 38 until the parts occupy the position shown in Fig. 2. The article to be grasped, which for example, may consist of an egg or plum 60, as shown by dotted lines in Fig. 3, is placed between the thumb and the fingers and then the pull upon the line 38 is relaxed which permits the springs 23 to close the sectional fingers to engage the outer side of the article while the inner side of the same is being engaged by the thumb and when the parts reach this position the tension upon the line 38 is discontinued altogether so that the spring 31 is free to move the adjusting bar 26 into engagement with the keeper 29, whereby the finger sections of each of the several fingers are individually held against outward or unfolding movement but retained in engagement with the article which is being grasped by reason of the several adjusting bars being interlocked with the keeper 29.

When it is again desired to release the article which is being held, the person simply pulls on the main draft line 38 which causes the several adjusting bars 26 to be first moved laterally out of engagement from the keeper 29 and then the several fingers move outwardly into their unfolded position, in which they release the article previously held within the grasp of the same.

The thumb is made hollow and preferably of suitable metal and pivoted at its inner or rear end to the palm by means of a pin 39 so that the same is capable of swinging inwardly and outwardly relatively to the palm and fingers. 40 represents a spring whereby the thumb is yieldingly held in its outermost position which spring is preferably of leaf form and secured at its inner end to the front part of the palm while its outer end bears against the inner side of the outer wall of the thumb, as shown in Figs. 2, 3, 5 and 6.

Means are provided for holding the thumb in different positions relative to the palm between the outermost and innermost positions of the same. These means include a latch or catch 41 pivoted at its outer end by means of a pin 42 to the inner side of the thumb and provided on its under or inner side with a plurality of notches 43 which are arranged in a longitudinal row and one or the other of which is adapted to be engaged with a stop or abutment having the form of a pin 44, mounted on the adjacent part of the thumb. This latch is yieldingly held in engagement with this stop by means of a spring 45 wound around the pivot pin 42 and connected at its opposite ends with the thumb and the palm. The latch is disengaged from the stop 44 by means of a shifting rod 46 extending through an opening 47 in the side of the palm and connected at its inner end with the free end of the latch 41 while its outer end is provided with a handle 48 whereby the same may be manipulated. When it is desired to adjust the thumb inwardly or outwardly the shifting rod 46 is first pushed inwardly for disengaging the latch 41 from the stop 44 which leaves the thumb free to be pushed either inwardly or outwardly to the desired position after which the shifting rod is operated to permit the latch 41 to engage the appropriate notch 43 with the stop 44 and thus hold the thumb into whatever position it may be adjusted.

The pivotal connection between the wrist and the palm comprises a hollow ball or spherical knuckle 49 arranged at the rear or inner end of the wrist and a spherical socket 50 mounted on the front end of the wrist and embracing the ball 49 which permits the palm to be turned into different positions relatively to the wrist. This socket is preferably made of sheet metal and means are provided for contracting and expanding the same so as to either grip or release the ball 49, this being preferably accomplished by providing the socket 50 at one point of its circumference with a transverse slit 51 and arranging two outwardly projecting lugs 52 on the socket on opposite sides of its spilt which are adjustably connected by means of a screw 53 having a handle 54. Upon loosening the screw 53 the grip of the socket upon the ball 50 is released, thereby permitting the palm to be turned into the desired position and upon tightening this screw 53 the socket 50 will grip the ball 49 and hold the palm in position.

The pulling stretches 36 of the several finger operated lines pass through the hollow ball 49 of the palm and in order to prevent the same from engaging with the inner or rear edge of this ball and wearing unduly rapid, a guide flange 55 is provided which is secured to the inner edge of the ball 49 and made of annular form and with an outwardly curved inner or rear edge which serves as a guide to be engaged by the pulling stretches of the operating lines and save the latter from undue wear.

The several improvements set forth in the foregoing description are all of comparatively simple construction considering the functions which they perform. The same can be readily operated to grasp and reliably hold articles and simulate other functions of the natural human hand, and the same are also not liable to get out of order by continued use.

We claim as our invention:

1. An artificial limb comprising a palm, a finger pivoted on said palm, and means for actuating said finger comprising a keeper on the palm, and an adjusting bar connected with said finger and adjustable lengthwise relative to said keeper.

2. An artificial limb comprising a palm, a finger pivoted on said palm, and means for actuating said finger comprising a keeper on the palm, and an adjusting bar pivoted on the finger and adapted to move lengthwise of said keeper and engage different parts of its length with the same.

3. An artificial limb comprising a palm, a finger pivoted on said palm, and means for actuating said finger comprising a keeper on the palm, and an adjusting bar pivoted to said finger and provided with a plurality of teeth arranged in a longitudinal row thereon and one or another of said teeth being adapted to engage said keeper.

4. An artificial limb comprising a palm, a finger pivoted on said palm, and means for actuating said finger comprising a keeper on the palm, an adjusting bar pivoted to said finger and provided with a plurality of teeth arranged in a longitudinal row thereon and one or another of said teeth being adapted to engage said keeper, and a spring interposed between said finger and bar and operating to hold the latter yieldingly in engagement with said keeper.

5. An artificial limb comprising a palm, a finger pivoted on said palm, and means for actuating said finger comprising a keeper on the palm, an adjusting bar pivoted on the finger and adapted to move lengthwise of said keeper and engage different parts of its length with the same, a guide pulley arranged on the palm above said keeper, and an operating line passing around said pulley and having two backwardly extending stretches one of which forms a releasing stretch and is connected with the rear part of the adjusting bar and the other of which forms a pulling stretch and is adapted to be operated manually.

6. An artificial limb comprising a palm, a finger pivoted on said palm, and means for actuating said finger comprising a keeper on the palm, an adjusting bar pivoted on the finger and adapted to move lengthwise of said keeper and engage different parts of its length with the same, a guide pulley arranged on the palm above said keeper, and an operating line passing around said pulley and having two backwardly extending stretches one of which forms a releasing stretch and is connected with the rear part of the adjusting bar and the other of which forms a pulling stretch and is adapted to be operated manually, said bar having its rear part arranged between said pulley and keeper and adapted to be moved laterally out of engagement from said keeper upon drawing backwardly on said pulling stretch.

7. An artificial limb comprising a palm, a finger pivoted on said palm, and means for operating said finger comprising a keeper arranged on the palm and having a backwardly projecting ratchet edge, an adjusting bar pivoted at its front end to said finger on one side of the fulcrum of the latter and provided on its inner side with a longitudinal row of ratchet teeth each of which has a rear inclined side and an abrupt front side, a spring for pressing said bar laterally toward said keeper, an operating line for moving said bar lengthwise and a spring for turning said finger inwardly.

8. An artificial limb comprising a palm, a finger pivoted to said palm and provided with an abutment on the inner side of its fulcrum, and a C-shaped spring secured at one end to said finger on the outer side of said fulcrum and bearing at its other end against said abutment.

9. An artificial limb comprising a palm, a finger having an inner section pivoted to the palm and an outer section pivoted to said inner section, a link connected at its rear end with the palm adjacent to the outer side of the pivotal connection between said palm and inner finger section while its front end is pivotally connected with said outer finger section inwardly and forwardly from the pivotal connection between the latter and the inner finger section, an adjusting bar pivoted at its front end to the link, and a keeper arranged on the palm and adapted to be engaged by different parts lengthwise of the adjusting bar.

10. An artificial limb comprising a palm, a thumb pivoted on said palm, and means for locking said thumb in different positions comprising a stop on the palm, and a latch pivoted on the thumb and provided with notches adapted to engage said stop.

11. An artificial limb comprising a palm, a thumb pivoted on the palm, means for locking said thumb in different positions comprising a stop on the palm, and a latch pivoted on the thumb and provided with notches adapted to engage said stop, and a spring for holding said latch yieldingly in engagement with said stop.

12. An artificial limb comprising a palm, a thumb pivoted on the palm, means for locking said thumb in different positions comprising a stop on the palm, and a latch pivoted on the thumb and provided with notches adapted to engage said stop, a spring for holding said latch yieldingly in engagement with said stop, a spring operating to move said thumb outwardly, and a shifting rod connected with said latch and extending to the exterior of the palm.

13. An artificial limb comprising a palm, fingers pivotally mounted on the palm, means for operating said fingers including an operating line, a wrist provided with an opening through which said line passes, means for pivotally connecting said palm and wrist comprising a socket arranged on the wrist and a ball arranged on the palm and turning in said socket, and an internal guide flange arranged on said ball and adapted to be engaged by said line.

ALBERTO PECORELLA.
VINCENT PATRICOLO.
FREDERICK H. APEL.